(12) United States Patent
Ogawa

(10) Patent No.: US 6,729,056 B2
(45) Date of Patent: May 4, 2004

(54) VEHICLE DISPLAY UNIT

(75) Inventor: Satoshi Ogawa, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/340,607

(22) Filed: Jan. 13, 2003

(65) Prior Publication Data

US 2003/0131510 A1 Jul. 17, 2003

(30) Foreign Application Priority Data

Jan. 15, 2002 (JP) ..................... P2002-005986

(51) Int. Cl.⁷ ............................................. G09F 21/04
(52) U.S. Cl. .................. 40/593; 73/866.3; D12/192
(58) Field of Search .................. 40/593, 564, 581; 362/482, 489; 73/866.3; D12/192; 248/27.1

(56) References Cited

U.S. PATENT DOCUMENTS

| | | | | |
|---|---|---|---|---|
| 4,222,435 A | * | 9/1980 | Kumagai | 73/866.3 |
| 4,271,897 A | * | 6/1981 | Tatemoto | 73/866.3 |
| D349,677 S | * | 8/1994 | Avitan | D12/192 |
| 5,642,929 A | * | 7/1997 | Ushimaru | 362/489 |
| D384,341 S | * | 9/1997 | Hoffman et al. | D12/192 |
| D413,295 S | * | 8/1999 | Sauter | D12/192 |
| 6,066,225 A | * | 5/2000 | Lopes | 362/489 |
| 6,179,453 B1 | * | 1/2001 | McMahon | 362/489 |
| D439,257 S | * | 3/2001 | Rossow et al. | D12/192 |
| D445,745 S | * | 7/2001 | Norman | D12/192 |
| D450,282 S | * | 11/2001 | Sauter | D12/192 |

* cited by examiner

*Primary Examiner*—Gary Hoge
(74) *Attorney, Agent, or Firm*—Morgan, Lewis & Bockius LLP

(57) ABSTRACT

A vehicle display unit includes a ground of light color and a mark of light color on the ground. An edge of the mark is colored so that coloring of shading-off is applied onto the edge of the mark such that a portion nearest to the mark is colored darkly and the ground side is colored lightly.

6 Claims, 3 Drawing Sheets

VEHICLE DISPLAY UNIT

BACKGROUND OF THE INVENTION

The present invention relates to a vehicle display unit provided for the purpose of operation of various vehicle switches.

Conventionally, in a vehicle display unit provided for the purpose of operation of various switches in an air conditioner or an audio system of a vehicle, for example, an automobile, generally a ground of a display portion is colored darkly, for example, black, brown, or dark gray, and required marks are colored on this ground lightly, for example, white or yellow. Using the marks cleared by this coloring as an index, the switches are operated, whereby switching and adjustment of the air conditioner or the audio system are performed.

On the other hand, there is a vehicle display unit in which a ground of a display portion is lightly colored, for example, silver. In this case, since marks are still colored white or yellow lightly, difference in lightness between the color of the ground and the color of the mark is small, so that visual recognition of the mark is bad.

SUMMARY OF THE INVENTION

The invention has been made in view of the above circumstances, and its object is to provide a vehicle display unit in which marks of light color are given on a ground of light color, which can make visual recognition of mark good, makes absorption on outward appearance of shear in printing possible, and can realize it.

In order to achieve the object, the vehicle display unit of the invention in which a mark of light color is given on a ground of light color is characterized in that an edge of the mark is colored so that a portion nearest to the mark is colored darkly and the ground side is colored lightly, that is, coloring of "shading-off" is applied onto the edge of the mark.

According to this invention, in the mark edge, the portion nearest to the mark is colored darkly, whereby the difference in lightness between the mark color and the ground color (light color) becomes large, and the visual recognition of the mark can be made good. Further, if the portion of the dark color is sheared in printing so that deviation is produced in its width, since the portion of the light color exists at the periphery (on the ground side) of its portion of the dark color, the shear in printing is shaded off and inconspicuous.

In this case, it is thought that the "shading-off" is applied in order-arrangement of plural colors that are different in strength of color, by difference in density of a dot mark of strong color, or by edging of strong color and radial patterns extending from this edging.

In The present disclosure relates to the subject matter contained in Japanese patent application Nos. 2002-005986 (filed on Jan. 15, 2002), which is expressly incorporated herein by reference in their entireties.

DETAILED DESCRIPTION OF PREFERRED EMBODIMENTS

First Embodiment

A first embodiment of the invention will be described below with reference to FIGS. 1 and 2.

Figure 2:
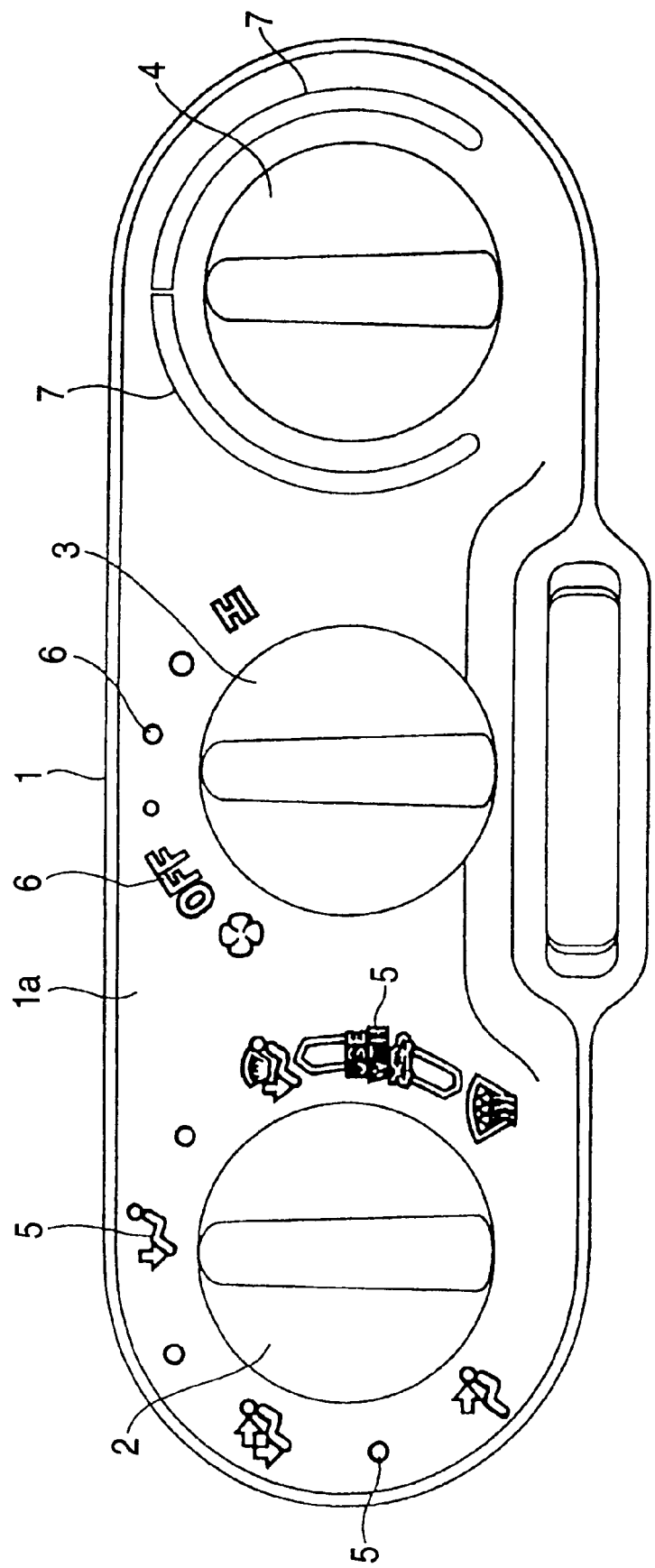
FIG. 2 is a front view of the whole of a display unit.

Firstly, FIG. 2 shows a full portion of a display unit of a vehicle, and particularly of an automobile. On a surface 1a of a display panel 1, a knob 2 that is an operational member of a wind direction switch, a knob 3 that is an operational member of a wind amount switch, and a knob 4 that is an operational member of a temperature controlling switch are provided in this order from the left; and marks 5, 6, and 7 functioning as an operational index are provided respectively around their knobs.

Figure 1:
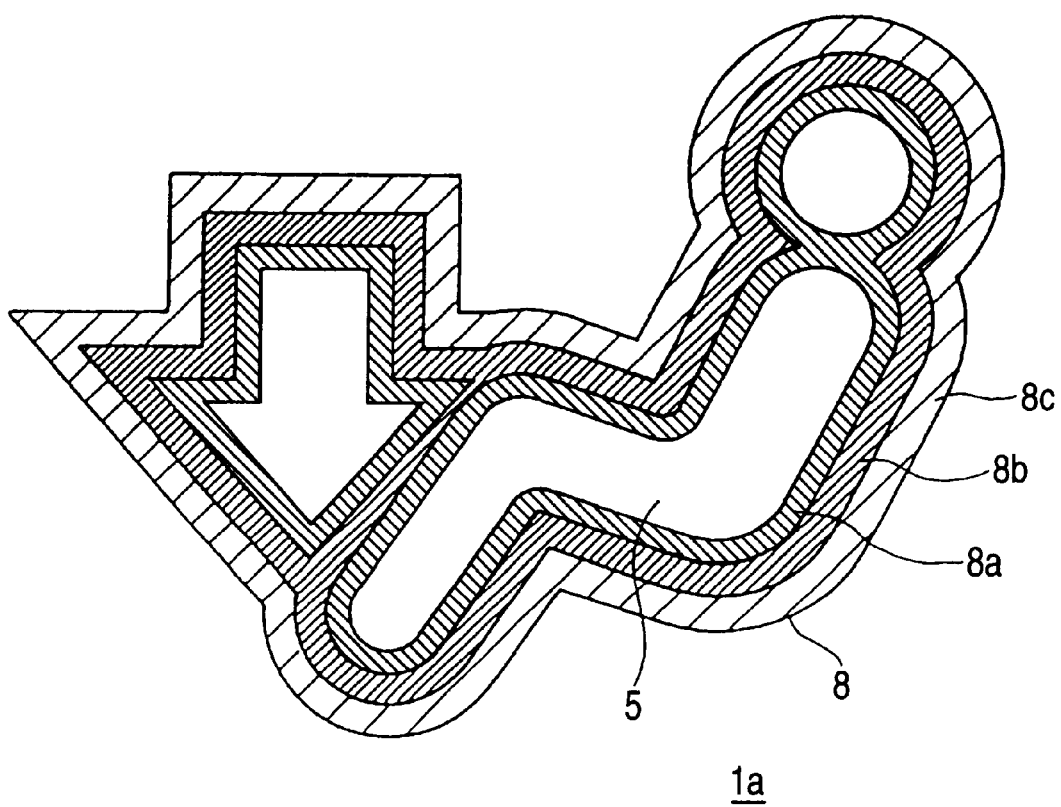
FIG. 1 is a front view of one mark, showing a first embodiment of the invention.

Regarding the marks 5 and 6 of them, as clear from FIG. 1 showing the mark 5 for the wind direction switch as one example, the mark 5 itself is colored light color such as white, yellow, or the like, while the surface 1a of the display panel 1 that is a ground on which this mark 5 is given is also colored light color such as silver or the like.

An edge 8 of the mark 5 is colored so that a portion nearest to the mark 5 is colored darkly and the ground side is colored lightly, that is, coloring of "shading-off" is applied onto the edge of the mark. Specifically, the edge 8 comprises three layers of an inner edge 8a, a middle edge 8b and an outer edge 8c. The inner edge 8a nearest to the mark 5 is colored the darkest color, for example, black, the middle edge 8b around the inner edge 8a is colored the lighter color than the color of the inner edge 8a, for example, dark gray, and the outer edge 8c around the middle edge 8b is colored the lighter color than the color of the middle edge 8b, for example, light gray. Namely, coloring of plural colors that are different in strength of color is applied to the edge 8 in order arrangement.

Coloring of the mark 5 and edge 8 is performed by printing.

By this constitution, even if the marks 5 and 6 of the light color are given on the ground (surface 1a of the display panel 1) of light color, since in the edges 8 of the marks 5 and 6, the portions nearest to the marks 5 and 6 are colored darkly, the difference in lightness between the color of the ground (light color) and the color of the portions nearest to the marks 5 and 6 becomes large, so that visual recognition of the marks 5 and 6 can be improved.

Further, if the portion of the dark color is sheared in printing so that deviation is produced in its width, since the portion of the light color exists at the periphery (on the ground side) of its portion of the dark color, the shear in printing is shaded off and inconspicuous. Therefore, occurrence of bad goods due to misprinting can be reduced.

Further, the edge 8 may comprise two layers of the inner edge 8a and the outer edge 8c. In such a case, the inner edge 8a is colored dark color, for example, black, and the outer edge 8c is colored the lighter color than the color of the inner edge 8a, for example, gray.

Figure 3:
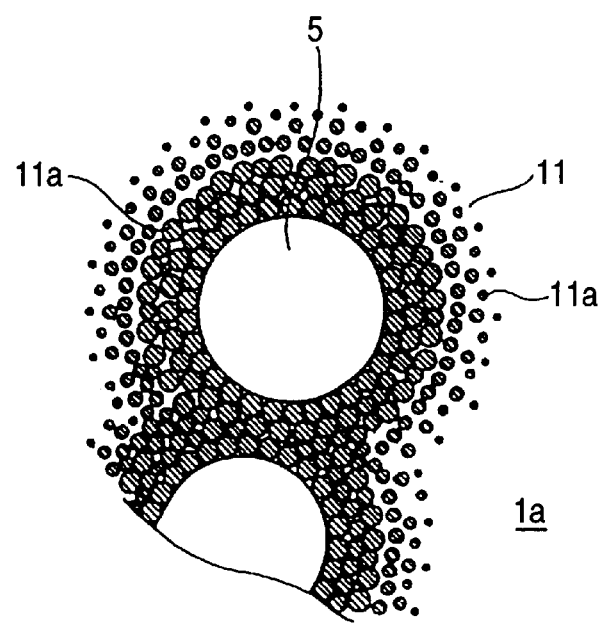
FIG. 3 is partially enlarged view of FIG. 1, showing a second embodiment of the invention.
Figure 4:
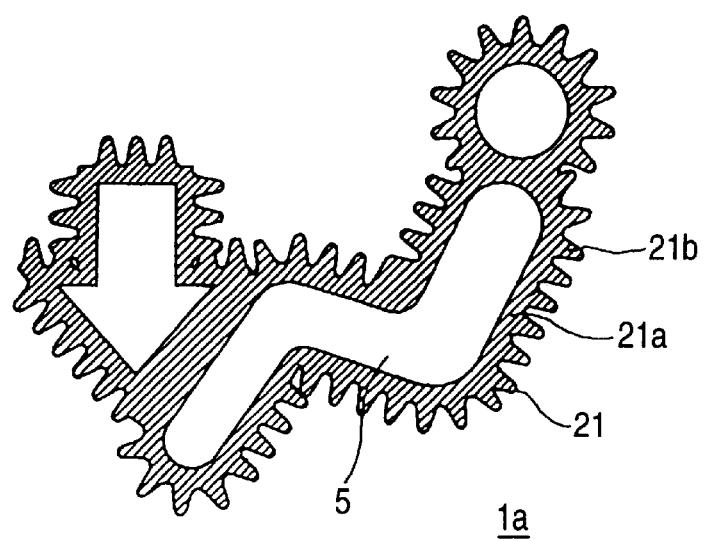
FIG. 4 is a diagram corresponding to FIG. 1, showing a third embodiment of the invention.

On the other hand, FIGS. 3 and 4 show a second embodiment and a third embodiment of the invention. In FIGS. 3 and 4, the same portions as those in the first embodiment are denoted by the same reference numerals and their description is omitted, and only the different portions will be described.

Second Embodiment

In the second embodiment shown in FIG. 3, "shading-off" of edges 11 of marks 5 and 6 (herein, only the mark 5 is also shown as an example and a part of the mark 5 is enlarged.) is applied by difference in density of a dot mark 11a of strong color (for example, black).

In this embodiment, coloring of the edges 11 are performed so that portions nearest to the marks 5 and 6 are colored darkly and the ground sides of them are colored lightly. Therefore, the working effect similar to that in the first embodiment can be obtained. Further, in this case, "shading-off" can performed in natural manner, whereby outward appearance can be improved.

Third Embodiment

In the third embodiment shown in FIG. 4, "shading-off" of edges 21 of marks 5 and 6 (herein, only the mark 5 is also shown as an example.) is applied by edging 21*a* of strong color (for example, black) and radial patterns 21*b* extending from this edging, of the same color as the color of the edging.

In this embodiment, though a mixing ratio of a mark color to a ground color per the unit area is zero in the edging 21*a*, the mixing ratio in the radial patterns 21*b* becomes twice as large as that in the edging 21*a*. In result, the edges 21 are colored so that portions nearest to the marks 5 and 6 are colored darkly and the ground sides are colored lightly. Therefore, the working effect similar to that in the first embodiment can be obtained.

In this case, each convex pattern of the radial patterns 21*b* tapers, whereby in the leading end of the convex pattern, the mixing ratio of the mark color to the ground color becomes larger and the degree of the "shading-off" becomes larger. However, the shape of each convex pattern of the radial patterns 21*b* may be not taper but rectangular.

As described above, according to the invention, in the vehicle display unit in which the mark of light color is given on the ground of light color, the edge of the mark is colored so that the portion nearest to the mark is colored darkly and the ground side is colored lightly, that is, coloring of "shading-off" is applied onto the edge of the mark. Hereby, visual recognition of the mark is improved, and absorption on outward appearance of shear in printing is made possible and can be realized.

What is claimed is:

1. A vehicle display unit comprising:

a ground of light color; and a mark of light color on the ground, wherein an edge of the mark is colored so that coloring of shading-off is applied onto the edge of the mark such that a portion nearest to the mark is colored darkly and the ground side is colored lightly.

2. The vehicle display unit according to claim 1, wherein the coloring of shading-off is applied in order arrangement of plural colors that are different in strength of color.

3. The vehicle display unit according to claim 1, wherein the coloring of shading-off is applied by difference in density of a dot mark of strong color.

4. The vehicle display unit according to claim 1, wherein the coloring of shading-off is applied by edging of strong color and radial patterns extending from the edging.

5. The vehicle display unit according to claim 1, wherein the light color of the ground is different from the light color of the mark.

6. The vehicle display unit according to claim 1, wherein the portion nearest to the mark is colored in black.

* * * * *